Feb. 11, 1930.                A. J. LEATHERDALE                    1,746,660
                MACHINE FOR WRAPPING BREAD AND OTHER ARTICLES
                         Filed March 5, 1926         4 Sheets-Sheet 1
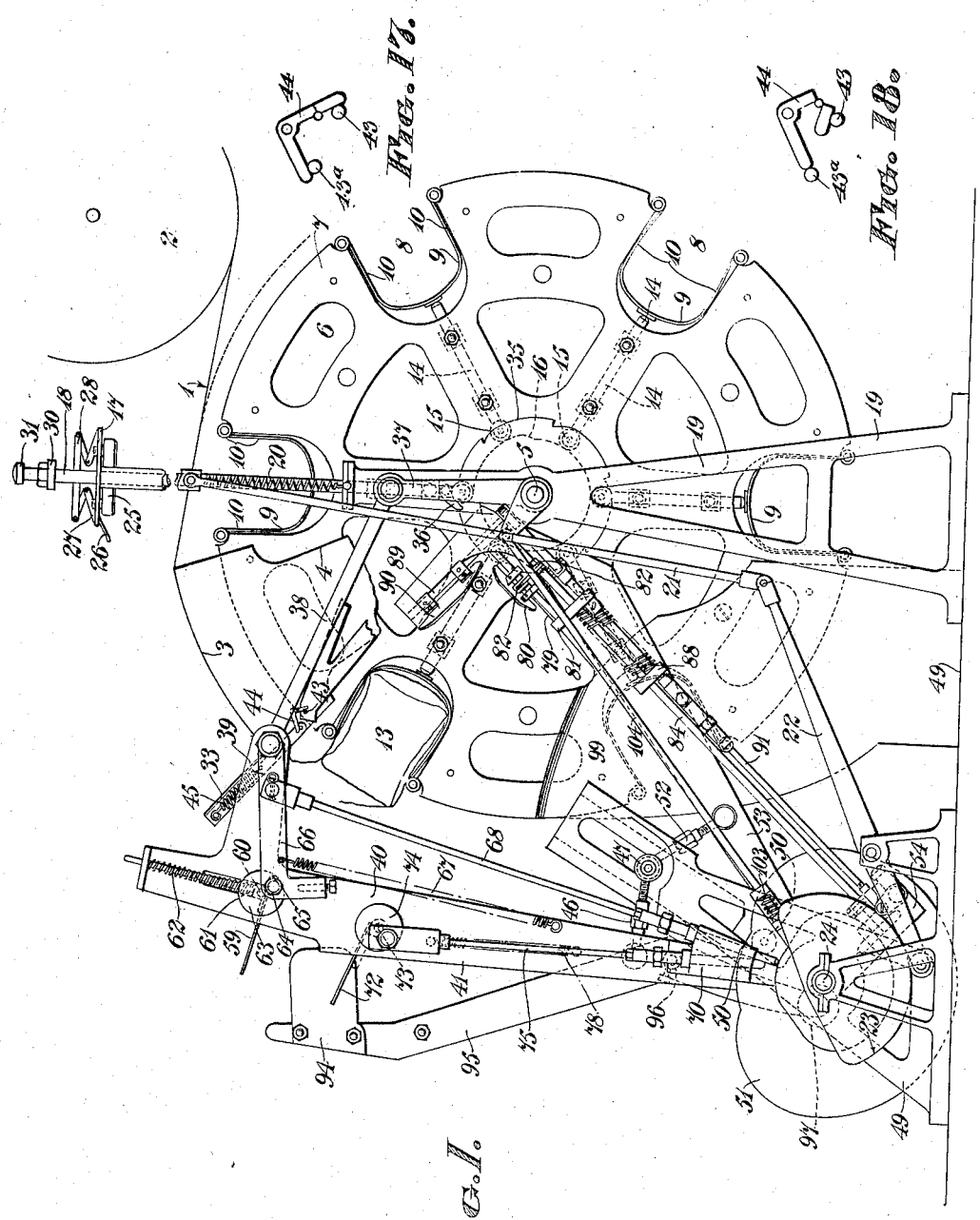

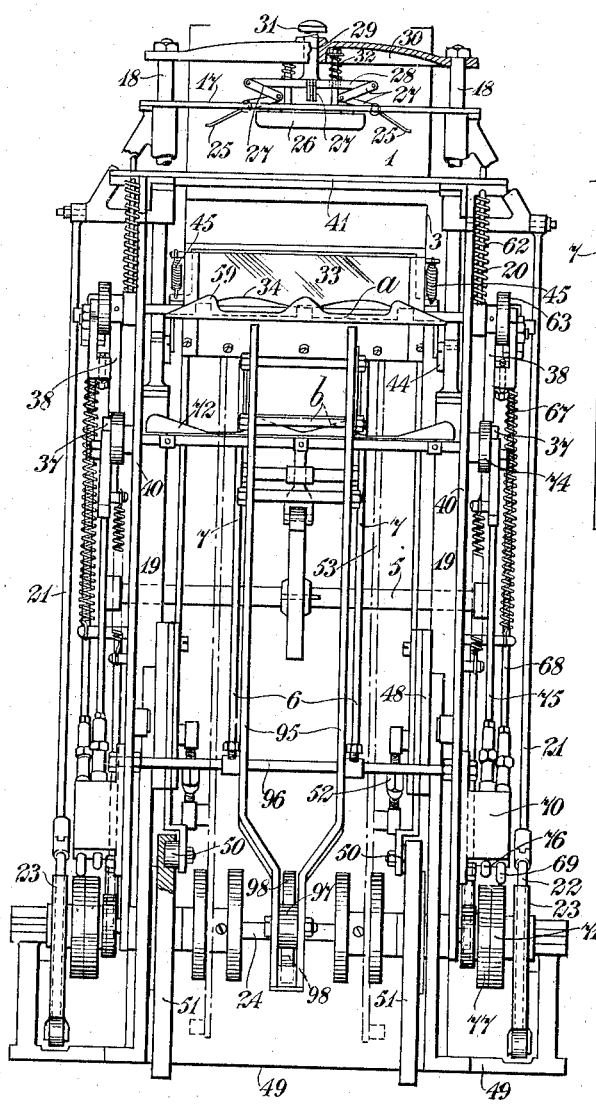
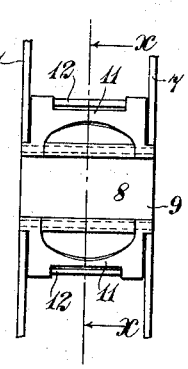
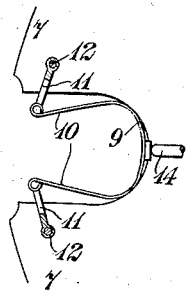
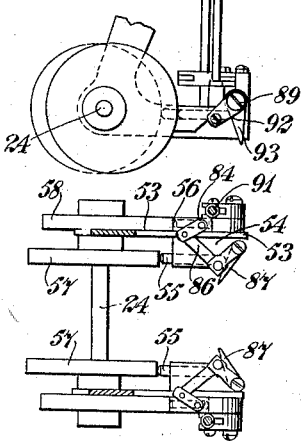

Feb. 11, 1930.　　　　A. J. LEATHERDALE　　　　1,746,660
MACHINE FOR WRAPPING BREAD AND OTHER ARTICLES
Filed March 5, 1926　　　　4 Sheets-Sheet 3

INVENTOR
A. J. LEATHERDALE,
BY Jno. ____ ATTY.

Feb. 11, 1930.  A. J. LEATHERDALE  1,746,660
MACHINE FOR WRAPPING BREAD AND OTHER ARTICLES
Filed March 5, 1926   4 Sheets-Sheet 4
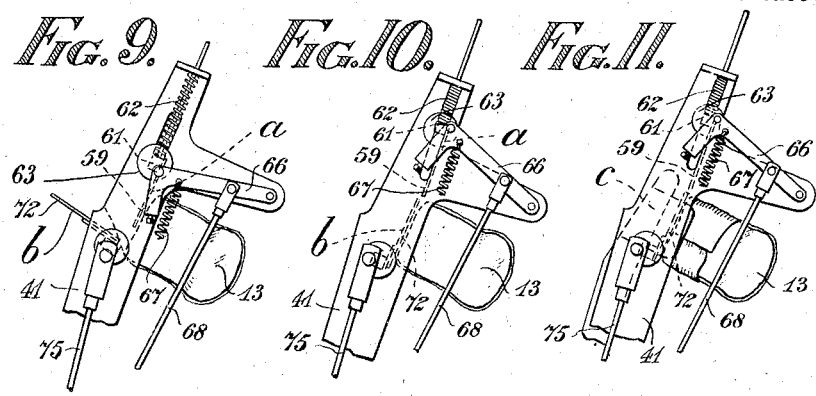
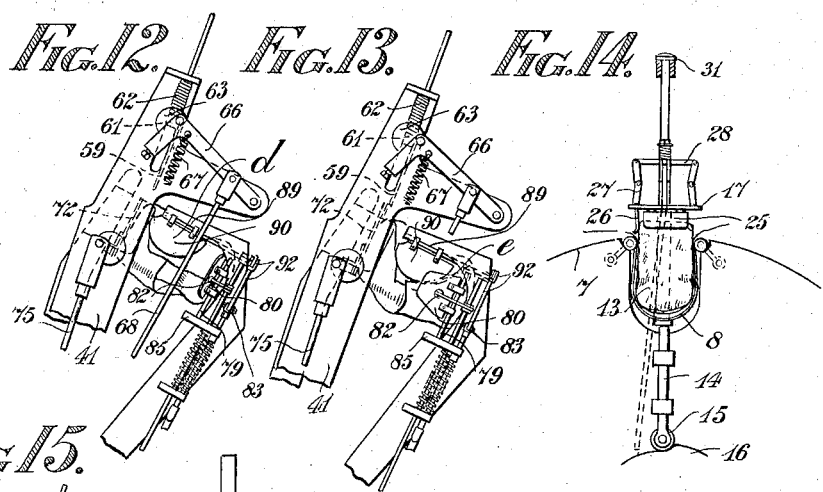
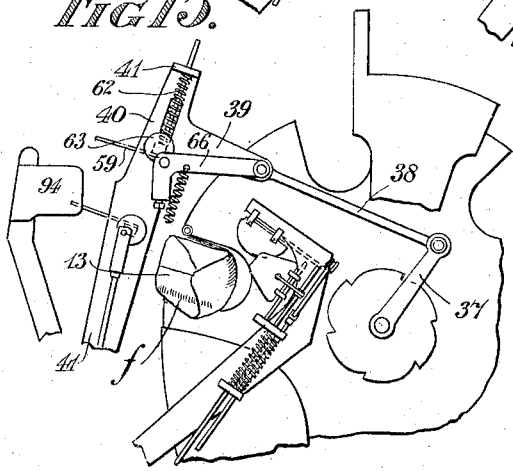
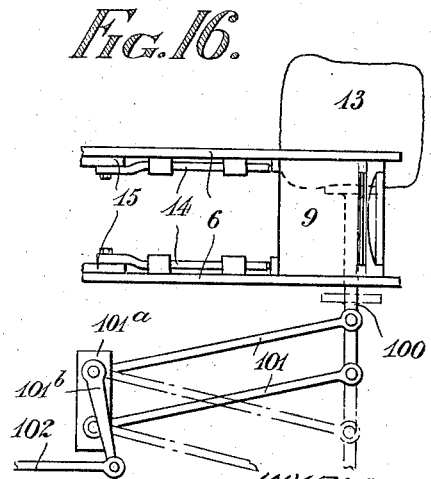
INVENTOR
A. J. LEATHERDALE,
BY Jno. Irvine ATTY.

Patented Feb. 11, 1930

1,746,660

UNITED STATES PATENT OFFICE

ALFRED JAMES LEATHERDALE, OF LONDON, ENGLAND

MACHINE FOR WRAPPING BREAD AND OTHER ARTICLES

Application filed March 5, 1926, Serial No. 92,617, and in Great Britain March 13, 1925.

This invention relates to improvements in machines for wrapping bread and other articles.

In machines for wrapping articles chiefly of uniform size it has previously been proposed to automatically feed the article together with wrapping paper into automatically actuated gripping formers or the like provided in a rotating drum or the like, means being provided to fold the longitudinal edges and ends of the wrapping paper on the article during the intermittent rotation of the drum and to open the formers so that the wrapped article may be automatically ejected.

The object of the present invention is to provide an improved machine more particularly for wrapping loaves of bread in an efficient and hygienic manner so as to protect the bread from dust and dirt.

A further object is to provide a machine with means to position loaves of bread which vary in size and shape on to wrapping paper and into formers, the weight of the bread and/or pressure thereon by the hand or mechanical means tending to shape the wrapping material around the loaf.

A still further object is to provide the machine with the minimum number of parts which may be cheaply manufactured so that the wrapping may be efficiently performed at the minimum cost.

A still further object is to provide a machine of the rotating drum type in which a number of loaves may be placed so that the wrapping operations, the sealing of the ends of the paper, the cooling of the seal and the ejection of the wrapped articles may be performed in sequence the arrangement being such that the whole of the operations for positioning, wrapping and ejection of the wrapped bread may be done through the medium of a single rotating shaft.

With these and other objects in view the invention consists in providing a machine for wrapping bread and other articles comprising a rotatable drum having a plurality of formers positioned therein, a guillotine and a table adapted to be moved and draw the wrapping paper from a roll or the like across a former in the receiving position, means to operate the guillotine and cut the paper and to move the guillotine and table back to its initial position, means to position the article and the wrapping paper into the former and means to partially rotate the drum to place the said former in position for folding operations.

One form of the invention will now be described with reference to the accompanying drawings, in which:—

Figure 1 is a side elevation of a bread wrapping machine constructed in accordance with this invention, parts being omitted for the sake of clearness;

Figure 2 is an end elevation of the machine shown in Figure 1, parts being shown in section;

Figure 3 is a partial plan of one of the formers;

Figure 4 is a section taken on the line $x$—$x$ of Figure 3;

Figure 5 is an elevation showing part of the operating mechanism for forming two of the end folds;

Figure 6 is a plan of the parts shown in Figure 5;

Figure 9 is a detail in elevation showing the first longitudinal folding operation;

Figure 10 is a similar view showing the second longitudinal folding operation;

Figure 11 is a similar view showing the first end folding operation;

Figure 12 is a similar view showing the second end folding operation;

Figure 13 is a similar view showing the third end folding operation;

Figure 14 is a similar view showing the second loaf in the former and in the position reached at the third end folding operation;

Figure 15 is a similar view showing the folding frames being brought out of their operative position, the drum being moved to a position where the last folding operation can be performed;

Figure 16 is a broken edge view showing the means for ejecting the wrapped loaf;

Figure 17 is a diagrammatic view showing the operation of the bell crank lever for operating the guillotine or knife and Figure 18 is a similar view showing the braking of the lever to permit the return movement of the knife.

Figure 7:
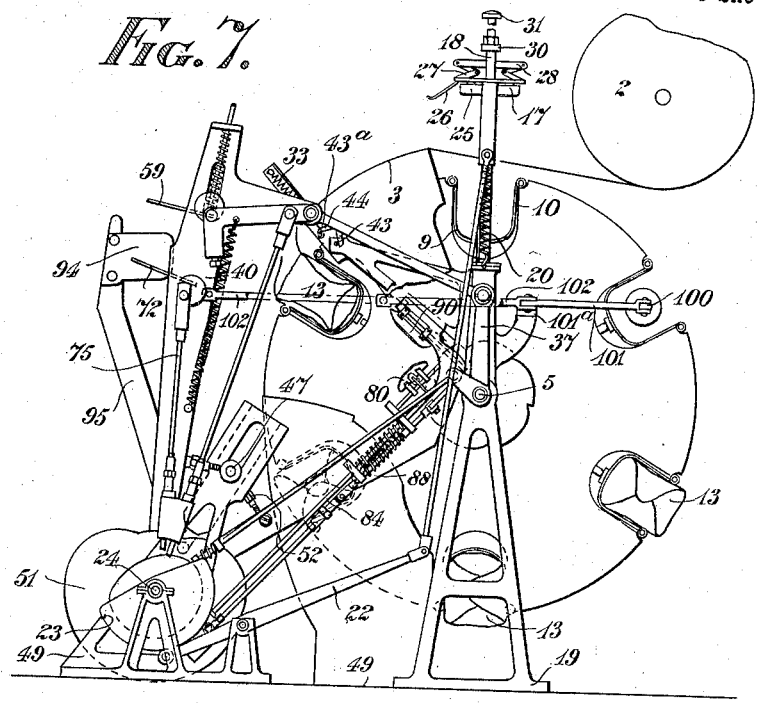
Figure 7 is an elevation showing a loaf in one of the formers in a position for the first folding operation.
Figure 8:
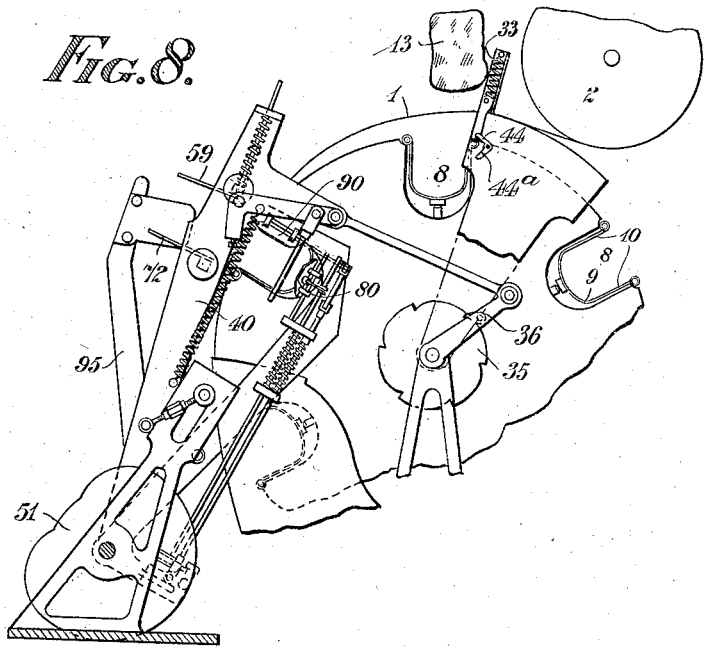
Figure 8 is a similar view showing the frames carrying the longitudinal folding means and the end folding means in operative position.

As shown, and when applied to a machine for wrapping, for instance, bread or the like, the paper or other suitable wrapping material 1 is fed from a roller drum or the like 2 onto a table 3 which is supported by a pair of arms 4 movable on a shaft 5 which carries a rotating drum or the like 6. This rotating drum or the like 6 comprises a pair of spaced plates 7 in which are mounted, preferably six formers 8. Each former 8 comprises a spring member 9 of substantially U-shape when the device is adapted to wrap thin loaves baked in tins and usually having rounded tops. The arms or sides 10 of each former 8 are pivotally connected to levers or arms 11 which are pivotally connected to shafts 12 connected to the plates 7 of the drum 6. The arrangement is such that the spring construction of the formers 8 will maintain the arms in a position to grip the loaf indicated at 13. In order to open the arms 10 so that the loaf 13 may be placed in each former, the base of each former is adapted to contact with a sliding member 14 provided with a roller or the like 15 which is adapted to contact with a suitably shaped cam or the like 16 disposed on the shaft 5 carrying the drum 6 of the machine. The loaves 13 are inserted in the formers 8 from above the drum in any suitable manner and means are provided to position the loaves 13 in the formers 8 before they are gripped by the sides 10 of the said formers 8. These loaf-positioning means comprise a vertically movable carrier 17 which is slidably mounted on vertical rods 18 disposed each side of the rotating drum 6 and connected to the main standards 19 of the machine. This carrier 17 is preferably adapted to be moved upwardly against the action of the springs or the like 20 by suitable links 21 and levers 22 which are operated through the medium of cams 23 driven from a cam shaft 24 arranged parallel with the shaft 5 carrying the drum 6 and positioned adjacent and to one side of the drum 6. The vertically movable carrier 17 is provided with a pair of hinged end flaps 25 and a side flap 26. These positioning flaps 25 and 26 are secured to suitable toggle levers or the like 27 which are connected to a guided plate member 28 which is formed or provided with an upstanding shaft 29 which is slidably mounted in a cross bar 30 secured on the upper ends of the vertical rods 18 on which the carrier 17 is adapted to slide. A suitable adjustable or fixed stop 31 is provided on the upstanding shaft 29 to co-operate with the cross bar 30 and limit the downward movement of the said plate member 28. The toggle levers 27 are normally maintained in their closed position by spring means or the like 32 so that the positioning flaps 25 and 26 are in their outward or open position and adapted to operate in the manner to be hereinafter described. To the table 3 on which the paper 1 is fed is secured a frame 33 carrying a guillotine knife 34. This is shown in Figure 2. The guillotine knife is slidable in the frame and is retained in its upper position by springs 45. The frame 33 and the guillotine knife 34 also serve as a guide to facilitate the positioning of the loaves 13 in the formers 8 as shown in Figure 8. The frame 33 also maintains the paper 1 against movement to either side. When the loaf 13 is in position the paper 1 is arranged in substantially U-shape formation between the loaf 13 and the walls of the former 8 and it is in this position that it is moved to a position where the ends of the paper 1 may be folded. The folding operation takes place when the drum 6 is moved one sixth of a revolution. For this purpose the drum 6 is provided with a ratchet wheel 35 and with this ratchet wheel 35 is adapted to co-operate a spring pressed pawl or the like 36 carried by a lever 37 which is connected to a connecting link 38 which is pivotally connected to an extension 39 on one of a pair of arms 40 which carry upper and lower longitudinal folding flaps. The pair of arms 40 which form part of a frame 41 are mounted for movement on the beforementioned cam shaft 24. When this frame 41 is moved to its inoperative position through the medium of suitable rollers co-operating with cams arranged on the cam shaft 24 in the manner to be hereinafter described, the drum 6 is partially turned to bring the loaf 13 and paper 1 into a position where it can be folded. The guillotine frame 33 and the table 3 are also moved forwardly with the drum 6 the arms 4 of the said table 3 being connected to the levers 37 carrying the pawl 36 of the ratchet mechanism. The paper 1 is also drawn from the roll 2 by the movement of the drum 6, the paper 1 being gripped between the loaf 13 and the former 8. When the loaf 13 is brought to the paper folding position the guillotine blade 34 is operated to cut the paper 1. The guillotine blade 34 is operated by a pair of bell crank levers 44 which are mounted on the guillotine frame 33. These bell crank levers cooperate with fixed stops 43 secured to the frame of the machine. One arm of each bell crank lever is divided and hinged at 44$^a$ and the other arm of each bell crank lever contacts with a pin 43$^a$ secured to a movable frame carrying the knife 34. This frame is housed within the frame 33. When the table 3 is moved nearly to the position shown in Figure 1 the divided arm of each bell crank lever 44 will contact with the stop 43 and further movement of the table will operate the bell crank lever 44 so that it engages with a pin 43ª and draws the same downwardly until the other arm of the bell crank lever passes or rides over the stop 43. As soon as the stop 43 is passed, the springs of the guillotine will raise the guillotine knife after it has performed its cutting operation on its downward movement by the operation of the bell crank levers. Upon the return movement of the table 3, the divided portion of each bell crank lever will turn on its hinge so as to permit each bell crank lever to pass the pins or stops 43 without the bell crank levers being operated. Suitable springs will be provided to maintain the divided portion of each bell crank lever in its correct position, and the divided portion will be so formed that it will act as a single member in one direction but fold up in the other or rearward direction to permit of it passing the stop 43. The above arrangement will ensure the quick release of the knife 34 after the paper has been severed as the divided portion of each bell crank lever is caused to wipe over the pin 43 before the table 3 has completed its stroke, thereby releasing the knife. Obviously each pin 43 may be adjustably mounted so that the paper can be cut at any desired position and it will be understood that the bell crank lever and the pin are preferably duplicated on each side of the machine as shown in Figure 2 of the drawings. Upon further rotation of the cam shaft 24 the frame 41 carrying the longitudinal folding flaps is moved toward the drum 6 and at the same time the guillotine frame 33 and its table 3 are moved back to their initial position behind the loaf-positioning means. The frame 41 which carries the longitudinal folding means is pivotally mounted on the cam shaft 24 and is moved toward and away from the drum 6 through the medium of adjustable links 46 which are connected to slidabel members 47 mounted in suitable carriers 48 supported on the base 49 of the machine. These slidable members 47 are fitted at their lower ends with rollers or the like 50 which are adapted to co-operate with suitable cams or the like 51 mounted on the cam shaft 24. The slidable members 47 are also connected by preferably adjustable links 52 to another pair of frame members 53 which are adapted to carry part of the end folding means. This latter pair of frame members 53 is also pivotally mounted on the cam shaft 24. Each of the latter frame members 53 is fitted with a housing 54 in which is mounted plungers 55 and 56 which are adapted to co-operate with cams 57 and 58 arranged on the cam shaft 24, for the purpose to be hereinafter described.

The means for forming the upper longitudinal fold $a$ comprise a finger plate 59 which is secured to a longitudinal shaft 60 which is rotatably mounted in bearings 61 which are slidably mounted in the first-mentioned frame 41. The bearings 61 carrying the shaft 60 having the upper longitudinal folding plate 59 are maintained in their lower position by suitable compression springs 62 mounted on the said frame 41. This latter shaft 60 is fitted at each end with crank arms or discs 63 having outstanding pins or the like 64. Each of these pins or the like 64 is mounted in a slot 65 cut in a lever member 66 which is fulcrumed on a suitable extension such as 39 of the frame 41. Each lever 66 is moved against the action of a spring 67 by means of an adjustable rod 68 which is connected at one end to the said lever 66 and at the other end to a plunger 69 which is slidably mounted in a housing 70 secured on the said frame 41. Each of these plunger members 69 is adapted to co-operate with a cam 71 provided on the cam shaft 24. The shape of the cams 71 is such as to give an angular displacement of about 90 degrees to the finger plate 59 and subsequently an upward sliding movement of the discs 63 through the medium of rod 68. This upward movement will move the said finger plates 59 out of operative position against the loaf through the medium of the levers 66 after the fold $a$ is completed, and to place the upper longitudinal finger plate 59 in a position to co-operate with the paper 1 when another fold has to be formed. The means for forming the lower longitudinal fold $b$ comprise a similar finger plate member 72 which is secured to a longitudinal shaft 73 rotatably mounted in the frame 41. At each end of this shaft are secured crank arms or discs 74 to which are connected vertically movable rods 75 which are adjustably connected to plunger members or the like 76 slidably mounted in the before-mentioned housings 70 secured to the frame 41. These plunger members 76 are adapted to co-operate with suitable cams 77 on the cam shaft 24 and are preferably held in engagement with the cams 77 by suitable springs 78. Each frame member 53 which carries the end folding means is fitted with a shaft 79 which is adapted to carry an end folding flap or plate 80. This shaft 79 is rotatably mounted in bearings 81 carried by the frame member 53 and the folding plate 80 is connected by a link connection 82 to an arm 83 carried by a rod member 84 which is rotatably mounted in bearings 85 carried by the frame member 53. The lower end of this rod 84 is connected by levers and links 86 to a tappet 87 which is adapted to co-operate with the slidably mounted plunger 55 which is adapted to contact with the face of the cam 57 mounted on the cam shaft 24. This cam 57 is duplicated so as to operate end folding plates 80 arranged each side of the drum 6 and these cams 57 are arranged to move the folding plates 80 to folding position against the action of suitable springs 88 to form the folds e. Each latter frame member 53 also carries another rotatably mounted shaft 89 arranged at right angles to the before-mentioned rotatably mounted shaft 79 and on the rotatably mounted shaft 89 is secured another folding plate member 90. This latter folding plate member 90 is adapted to be moved to its operative position by a vertically movable spring-pressed and adjustable rod 91 which is connected at one end by connections 92 to the rotating shaft 89 and at the other end to a tappet 93 which is pivoted in the lower housing 54 which is carried by the said frame 53. Each of these tappets 93 is adapted to be engaged by the plunger 56 which co-operates with the cam 58 mounted on the cam shaft 24. It will be understood that two of these cams 58 are provided on the cam shaft 24 so as to operate a folding flap 90 at each side of the rotatable drum 6 to form the folds d. In order to form folds c opposite to the first-described end folds e a pair of spaced plates or the like 94 are secured to a frame or carrier 95 which is pivotally mounted on a transverse shaft 96 which is carried by the first-mentioned frame member 41 which carried the longitudinal folding means. This frame or carrier 95 is fitted at its lower end with a roller or the like 97 which is adapted to co-operate with a cam 98 secured on the cam shaft 24. In order to form the last fold a plate member 99 is arranged at each side of the rotating drum 6 below the before-described end folding means. These latter plate members 99 are adapted to form the last fold f during the rotation of the drum 6 and before the loaf 13 assumes its third position. When the drum 6 is moved a further one-sixth of the revolution the wrapped loaf 13 is brought adjacent to heating devices not shown which are adapted to seal the folded ends of the wrapping. Whilst this sealing is taking place the folding means are operating on the loaf which is next brought into the folding position. During the further two travels of the loaf 13 after the sealing means have been in operation, the cooling of the seal takes place. Any suitable means may be provided to effect this cooling means if found necessary. In order to eject the wrapped loaf 13 suitable plunger means are provided adjacent to the sixth position. The plunger means comprise a transversely movable plunger 100 which is connected by parallel rule links 101 to a lever and link mechanism 102 which is connected to the frame 41 which carries the longitudinal folding means a and b. When this latter frame 41 is moved toward the drum 6 the plunger 100 is moved transversely to eject the wrapped loaf to one side of the machine. In order to permit the spring formers 8 to grip the loaf and the paper when the loaf is first fed into the machine by hand or gravity or mechanically operated means and after it has been centralized in the machine by the positioning flaps 25 and 26 the cam 16 which actuates the formers 8 is given partial movement in a rearward direction against the action of suitable spring means 103 by suitable connections or levers 104 which are actuated in any suitable manner from, for instance, the cam shaft 24. This rearward movement of the cam 16 will allow the spring formers 8 to grip the paper 1 and loaf 13 positioned therein before the drum 6 is given a further partial rotation. The cam 16 is so arranged that the former 8 which is next to come into feeding position is opened so as to allow the ejecting plunger 100 to eject the wrapped loaf 13. The ejector mechanism for ejecting the wrapped loaf comprises a plunger 100 which is transversely movable across the machine so as to eject the loaf in the sixth position. The plunger 100 is connected by parallel rule links 101 which are pivoted on a bracket 101ª secured to the main frame 19 of the machine. One of these links 101 is moved by a lever 101ᵇ. The outer end of this lever 101ᵇ is connected by a rod 102 to the frame 41 which carries longitudinal folding means a and b. Upon the forward movement of the frame 41, the rod 102 will be moved longitudinally. This will turn the lever 101ᵇ which is carried by a pivot on which one of the links 101 is fixed and move the plunger 100 to eject the loaf 13. When the frame 41 moves away from the machine the rod 102 will also move, turn the lever 101ᵇ and withdraw the ejector 100.

In operation the loaves 13 are fed by any suitable means onto the paper 1 which is positioned over the upper former 8 which is opened out to receive the loaf 13 and paper 1 by means of the cam 16 disposed within the rotating drum 6. The loaf 13 is partially positioned into the former 8 by means of the frame 33 of the guillotine. The rotating cam shaft 24 which is rotated by hand or any other suitable means, will bring the cams 23 into position to effect the downward movement of the loaf-positioning means. The vertically movable carrier 17 will move downwardly against the action of its springs 20 until the stop 31 on the upstanding shaft 29 contacts with the cross bar 30 secured on the upper ends of the vertical rods 18. Further movement of the levers 22 which co-operate with the cams 23 will draw the vertically movable carrier 17 on the loaf 13, and the toggle levers 27 will be opened out against the action of the springs 32. The vertical movable carrier 17 is moved downwardly by the movement of the rods 21 and operating levers 22 which co-operate with the cams 23. This downward movement of the carrier 17 onto the loaf 13, which latter is positioned against the frame 33 and on the paper above the former 8, will draw the carrier 17 downwardly with the flaps 25 and 26 pivoted thereto in their open position until the stop 31 on the upstanding shaft 29 contacts with the cross bar 30 which is fixed on the standards 19 of the machine. Upon further movement of the levers 22 which are in contact with the cams 23, the carrier 17 will be moved downwardly away from the plate member 28 which is secured on the lower end of the upstanding shaft 29. This relative movement will open out the toggle levers 27 and the flaps 25 and 26 will assume a vertical position. This later movement will be against the action of the springs 32. The position of the toggles 27 and flaps 25 and 26 is shown more clearly in Figure 14. It will be understood that the frame 33 will position the loaf at its rear side and the flap 26 will operate on the front of the loaf. The flaps 25 will position the sides of the loaf in the machine. When the cams 23 again depress the levers 22 the carrier 17 will move upwardly and the toggles 27 will fold to their initial position and open out the flaps 25 and 26 as the springs 32 will act to fold these toggles. The parts will then assume the position shown in Figure 2. The springs 20 will maintain the levers 22 in contact with the cams 23 mounted on the shaft 24. The levers 22 and cams 23 and associated parts are arranged on each side of the machine. This opening out of the toggle levers 27 will move the positioning flaps 25 and 26 to their vertical position so that they will contact with the loaf 13 and position it in correct position in the former 8. When the loaf is thus positioned the cam 16 within the drum 6 will be moved slightly rearwardly so that the spring former 8 will engage and hold the paper 1 on the sides of the loaf 13. Upon further movement of the cam shaft 24 the frame 41 carrying the longitudinal folding means will be moved away from the drum 6 and this movement will rotate the drum 6 through an arc of 60 degrees through the medium of the link connections 38 and the pawls 36 co-operating with the ratchet teeth on the ratchet wheels 35. The guillotine frame 33 and its table 3 will also be moved in unison with the drum 6 and the bell crank levers 44 mounted on the guillotine frame 33 will co-operate with fixed stops 43 to operate the guillotine blade 34 against the action of its springs 45 to cut the paper 1. Upon further movement of the cam shaft 24 the frame 41 carrying the longitudinal folding means will be moved toward the drum 6, and the frame 53 carying the end folding means will be moved into operative position toward the frame 41 carrying the longitudinal folding means. During this movement the guillotine frame 33 and its table 3 will be brought back to its initial position and the pawl 36 will move rearwardly over the ratchet wheel until the pawl 36 engages with the next adjacent tooth. The lower arm of each bell crank lever 44 on the guillotine frame 33 is hinged to permit the movement of the guillotine past the stops 43 which operate the guillotine blade 34. The paper 1 which is drawn from the roll by the movement of the drum 6 will lie over the next former 8 which is now brought into feeding position. A second loaf 13 can now be fed into this former 8 in the manner previously described. Upon further movement of the cam shaft 24 the upper longitudinal folding finger plate 59 is operated through the cams 71 so as to fold the free portion of the paper 1, which has been previously cut by the guillotine blade 34, onto the loaf 13 and form the fold $a$ as shown in Figure 9. Upon further movement of the cam shaft 24 the lower longitudinal finger plate 72 is moved to fold the lower portion of the paper 1 onto the upper finger plate 59 and the wrapping paper 1 disposed thereunder. Thus the fold $b$ is formed as shown in Figure 10. Further movement of the cam shaft 24 will move the frame member 95, which carries the end folding flaps 94 through the medium of its cam 98 and form the fold $c$. This latter frame 95 is pivoted on the frame 41 carrying the longitudinal folding means. Still further rotation of the cam shaft 24 will move through the medium of the rods 91, tappets 93, and plungers 56, one pair of end folding flaps 90 into operative position to form the end fold $d$. Further rotation of the cam shaft 24 will operate the other folding flaps 80 through the medium of the rods 84, tappets 87, and plungers 55, to form the fold $e$ as shown in Figure 13. Thus the wrapping paper 1 on each end of the loaf 13 will be folded three times. Further rotation of the cam shaft 24 will move the flaps 94 out of operative position and also draw the upper longitudinal folding plate 59 upwardly out of its folding position and the drum 6 will then be rotated through a further 60 degrees of its movement. During this movement the remaining and lower portion $f$ of the wrapping paper 1 in each side of the loaf will be folded by contacting with the fixed folding members 99, and whilst this movement is taking place the loaf 13 which is last fed into position will be moved to the wrapping position. Whilst the feeding of another loaf and the wrapping of the second loaf is taking place the folded ends of the wrapping material on the first loaf are sealed by any suitable sealing means such as an electric or gas heater acting on the wax of the wrapping paper. The sequence of operations will be continued during further movement of the drum until the first loaf reaches for instance its sixth position. When the loaf 13 is in this position the former 8 is opened out by the cam 16 and the ejecting plunger 100 is operated by the movement of the frame 41 carrying the longitudinal folding means and the wrapped loaf 13 is ejected.

It will be seen that I have provided a machine which will automatically wrap articles of various shapes in an efficient and expeditious manner.

What I claim is:—

1. A machine for wrapping bread and other articles comprising a rotatable drum having a plurality of formers positioned therein, a guillotine and a table adapted to be moved and draw the wrapping paper from a source of supply across a former in the receiving position, means to operate the guillotine and cut the paper and to move the guillotine and table back to its initial position, means to position the article and the wrapping paper into the former and means to partially rotate the drum to place the said former in position for folding operations, for the purposes described.

2. A machine for wrapping bread and other articles, as claimed in claim 1, wherein the guillotine and table are moved through the medium of a frame mounted for movement on a cam shaft, the said frame carrying means for partially folding the paper on the article.

3. A machine for wrapping bread and other articles as claimed in claim 1, wherein the means for positioning the article in the former comprises the frame of the guillotine, and a vertically movable sliding plate, having a plurality of positioning flaps, such sliding plate being operatively connected with the driving means of the machine.

4. A machine for wrapping bread and other articles as defined in claim 1, wherein the means for positioning the article in the former comprises the frame of the guillotine, a vertically movable sliding plate having a plurality of positioning flaps and means for connecting the sliding plate with the driving means of the machine, said flaps being connected to toggle levers connected to an auxiliary spring pressed sliding plate, means such as stops being arranged to provide relative movement of the sliding plate to move the positioning flaps into operative or inoperative positions, for the purposes described.

5. A machine for wrapping bread and other articles, as claimed in claim 1, wherein the longitudinal edges of the paper are folded on the article by means of upper and lower longitudinal folding flaps secured on shafts rotatably mounted in the frame pivoted on the cam shaft.

6. A machine, as claimed in claim 1, wherein the drum is rotated through the medium of ratchet and pawl mechanism upon the movement of the frame.

7. A machine, as claimed in claim 1, wherein upper and lower longitudinal folding flaps are operated through the medium of cranks secured on shafts, and spring pressed rods being connected with such cranks and adapted to be operated by cams on the cam shaft.

8. A machine, as claimed in claim 1, wherein cranks of the upper longitudinal folding flap are fitted with pins movable in slots formed in levers, and rods with which the levers are operatively connected.

9. A machine, as claimed in claim 1, wherein an auxiliary frame is pivotally connected on the frame pivoted on the cam shaft and operatively connected with a cam on the cam shaft and fitted with end folding flaps, for the purposes described.

10. A machine, as claimed in claim 1, wherein the means for folding the ends of the wrapping paper comprise a pair of arms pivoted on the cam shaft, a pair of folding flaps hinged on each arm, means operatively connected with plungers and with the said flaps and cams on the cam shaft to operate said plungers and folding flaps.

11. A machine, as claimed in claim 1, wherein a frame carrying the longitudinal folding means and the arms carrying the end folding means are connected to a sliding member operatively co-operating with cams arranged on the cam shaft, for the purposes described.

12. A machine, as claimed in claim 1, wherein the formers are of spring-like material and pivotally connected to the drum through the medium of arms and levers, for the purposes described.

13. A machine, as claimed in claim 1, wherein the former in the receiving position is opened by means of a cam to permit the article to be inserted together with the paper and automatically closed to grip the paper around the article.

14. A machine, as claimed in claim 1, wherein a cam is moved against the action of resilient means through the medium of levers operatively connected with the driving means, for the purposes described.

ALFRED JAMES LEATHERDALE.